US009356833B2

(12) United States Patent
Xu et al.

(10) Patent No.: US 9,356,833 B2
(45) Date of Patent: May 31, 2016

(54) MEDIA GATEWAY DEVICE AND METHOD FOR FORWARDING DATA FRAMES

(71) Applicant: Huawei Technologies Co., Ltd., Shenzhen (CN)

(72) Inventors: Jian Xu, Shenzhen (CN); Guangmin Zhou, Shenzhen (CN); Jie Zhou, Shenzhen (CN); Huiqin Yuan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 340 days.

(21) Appl. No.: 14/028,092

(22) Filed: Sep. 16, 2013

(65) Prior Publication Data

US 2014/0010239 A1 Jan. 9, 2014

Related U.S. Application Data

(63) Continuation of application No. PCT/CN2011/083821, filed on Dec. 12, 2011.

(30) Foreign Application Priority Data

Mar. 16, 2011 (CN) .......................... 2011 1 0063346

(51) Int. Cl.
*H04L 12/28* (2006.01)
*H04L 12/24* (2006.01)
*H04L 12/46* (2006.01)
*H04L 29/06* (2006.01)

(52) U.S. Cl.
CPC ........ *H04L 41/0836* (2013.01); *H04L 12/4625* (2013.01); *H04L 12/4641* (2013.01); *H04L 41/12* (2013.01); *H04L 65/103* (2013.01)

(58) Field of Classification Search
CPC ...................................................... H04L 12/24
USPC .......................................................... 370/395
See application file for complete search history.

(56) References Cited

U.S. PATENT DOCUMENTS

2007/0086442 A1 4/2007 Waitzmann
2007/0104192 A1 5/2007 Yoon et al.

FOREIGN PATENT DOCUMENTS

CN 1571384 A 1/2005
CN 1601996 A 3/2005
(Continued)

OTHER PUBLICATIONS

Chen et al., "Design of IP Media Gateway System" Radio Engineering vol. 38, No. 8, 2008, 4 pages. English Abstract.

*Primary Examiner* — Shripal Khajuria
(74) *Attorney, Agent, or Firm* — Brinks Gilson & Lione

(57) ABSTRACT

The present invention provides a media gateway device and a method for forwarding data frames. The media gateway device comprises: a master module, a switch module, a relay access module and a media resource module; the switch module comprises three independent Virtual Local Area Networks (VLANs), i.e., a first VLAN, a second VLAN and a third VLAN, respectively; the media resource module is connected to the switch module through the second VLAN, and the switch module is connected to an external Internet Protocol (IP) packet network through the third VLAN; the media gateway device further comprises a network layer static routing table. By using the media gateway device and the method for forwarding data frames according to the present invention, the number of the external interfaces of the media gateway device can be reduced, and the interface of the switch module can be managed by the VLAN.

13 Claims, 10 Drawing Sheets

(56) References Cited

FOREIGN PATENT DOCUMENTS

| | | |
|---|---|---|
| CN | 1694430 A | 11/2005 |
| CN | 1953430 A | 4/2007 |
| CN | 101309205 A | 11/2008 |
| CN | 101309235 A | 11/2008 |
| CN | 101540730 A | 9/2009 |
| CN | 101848134 A | 9/2010 |
| CN | 102104525 A | 6/2011 |
| EP | 1729446 A1 | 12/2006 |
| KR | 10-0694296 B1 | 3/2007 |

MEDIA GATEWAY DEVICE AND METHOD FOR FORWARDING DATA FRAMES

CROSS-REFERENCE TO RELATED APPLICATIONS

This application is a continuation of International Application No. PCT/CN2011/083821, filed on Dec. 12, 2011, which claims priority to Chinese Patent Application No. 201110063346.2, filed on Mar. 16, 2011, both of which are hereby incorporated by reference in their entireties.

FIELD OF THE INVENTION

The present invention relates to the communication technology, and particularly, to a media gateway device and a method for forwarding data frames.

BACKGROUND OF THE INVENTION

The Next Generation Network (NGN) gradually develops from the circuit switching that is mainly adopted in the traditional Public Switched Telephone Network (PSTN) to the packet switching. The NGN is a fusion of the original PSTN and Internet Protocol Data Network (IPDN), which converges voices and data to the identical seamless network using a distributed architecture, thereby not only reducing the burthen of the PSTN, but also increasing and enhancing many old and new services through the new characteristics of the IP technology.

The NGN is mainly composed of a soft switch device, a media gateway, a signaling gateway, a terminal device and an integrated access device. The soft switch device provides the NGN with functions of call control and connection control of the services requiring instantaneity, and is the calling and controlling core of the NGN. The media gateway usually includes an access module, a switch module, a media resource module and a master module. In which, the access module may be classified into a relay access module connected to the PSTN or the Private Branch eXchange (PBX) and a user access module connected to the user's Foreign eXchange Station (FXS). In which, depending on whether the access module includes the user access module, the media gateway may be classified into a relay media gateway and an access media gateway. FIG. 1A is a schematic diagram of the working principle of a media gateway in the prior art, and FIG. 1B is a schematic diagram of the working principle of another media gateway in the prior art. With reference to FIGS. 1A and 1B, the working principle of the media gateway in the prior art includes:

1) in the direction from the circuit domain (including the user connected to the PSTN, the PBX and the FXS) to the IP network: the access module receives the Time Division Multiplexing (TDM) data from the circuit domain, and switches to the media resource module through a Time Slot Interchange (TSI) circuit in the switch module; a media processing unit of the media resource module receives the TDM data, performs a code format conversion of the TDM data, encapsulates the TDM data as an IP message that usually may be a Real-time Transport Protocol (RTP) message or a Real-time Transport Control Protocol (RTCP) message, and forwards to the IP network through the packet interface in the media resource module connected to the IP network.

2) in the direction from the IP network to the circuit domain: the packet interface in the media resource module receives the IP message, which is usually an RTP message or an RTCP message, and transmits the IP message to the media processing unit of the media resource module; the media processing unit processes the IP message and converts it into TDM data in the circuit domain through de-encapsulation and code format conversion, and then switches the TDM data to the access module through the TSI of the switch module; and the access module transmits the TDM data to the circuit domain network through an interface.

Herein, the master module of the media gateway is mainly responsible for managing the switch module, the access module and the media resource module. Specifically, the master module performs a Layer 2 (L2) switch through an LAN Switch (LSW) in the switch module, and transmits a management message to respective modules for a management thereof. In addition, when needing to be processed between different media resource modules, the IP message may also undergo an L2 switch through the LSW, so as to be forwarded between different media resource modules.

During the implementation of the present invention, the inventor finds that the prior art at least has the following problem: in the existing media gateway, each media resource module at least requires one packet interface to be connected to the IP network; the number of the external interfaces is large, and especially when a highly reliable interface binding manner (i.e., binding two packet interfaces) is adopted, the number of the external interfaces will be doubled, which requires a large amount of maintenance of the external interfaces and causes great inconveniences. In addition, since a large number of packet interfaces are directly exposed to the IP network, the media gateway is easy to be attacked, and the reliability of the whole media gateway is threatened.

SUMMARY OF THE INVENTION

The embodiments of the present invention provide a media gateway device and a method for forwarding data frames, so as to reduce the number of the external interfaces, and improve the security of the media gateway device.

An embodiment of the present invention provides a media gateway device, including a master module, a switch module, at least one relay access module and at least one media resource module; wherein the switch module includes three independent Virtual Local Area Networks (VLANs), i.e., a first VLAN, a second VLAN and a third VLAN; the relay access module, the master module and the media resource module are connected to the switch module through the first VLAN, the media resource module is further connected to the switch module through the second VLAN, and the switch module is connected to an external Internet Protocol (IP) packet network through the third VLAN; and wherein the media gateway device further includes a network layer static routing table, which stores a Media Access Control (MAC) address corresponding to the second VLAN, an MAC address corresponding to the third VLAN, as well as an MAC address and an IP address corresponding to the media resource module; and wherein the master module is configured to perform a control management of the relay access module, the media resource module and the switch module through the first VLAN; and wherein the switch module is configured to forward, through the third and second VLANs, a first data frame of the external IP packet network to the media resource module for a processing, according to the MAC address corresponding to the second VLAN, the MAC address corresponding to the third VLAN, as well as the MAC address and the IP address corresponding to the media resource module in the network layer static routing table; and wherein the media resource module is configured to receive the first data frame and forward the first data frame to the relay access module; the media resource module is further configured to forward, through the second and third VLANs, a second data frame corresponding to the relay access module to the external IP packet network, according to the MAC address corresponding to the second VLAN, the MAC address corresponding to third VLAN, as well as the MAC address and the IP address corresponding to the media resource module in the network layer static routing table.

An embodiment of the present invention provides a method for forwarding data frames, for use in any media gateway device provided by the present invention, including:

for data frames in the in-node direction:

forwarding by the switch module, through the third and second VLANs, a first data frame of the external IP packet network to the media resource module for a processing, according to the MAC address corresponding to the second VLAN, the MAC address corresponding to the third VLAN, as well as the MAC address and the IP address corresponding to the media resource module in the network layer static routing table;

for data frames in the out-of-node direction:

forwarding by the media resource module, through the second and third VLANs, a second data frame corresponding to the relay access module to the external IP packet network, according to the MAC address corresponding to the second VLAN, the MAC address corresponding to third VLAN, as well as the MAC address and the IP address corresponding to the media resource module in the network layer static routing table.

With the media gateway device and the method for forwarding data frames according to the present invention, the VLAN technology is adopted to manage the interfaces of the switch module, which are classified into three VLANs, wherein the data frames are internally forwarded through the second VLAN, and the data frames are concentratedly forwarded, through the third VLAN, between the media gateway device and the external device in the external IP packet network, thereby reducing the number of the external interfaces of the media gateway device. Meanwhile, the interfaces of the switch module are managed through the VLAN, which achieves the isolation between data frames in the external IP packet network to some extent, and improves the security of the media gateway device.

BRIEF DESCRIPTION OF THE DRAWINGS

In order to more clearly describe the technical solutions of the embodiments of the present invention or the prior art, the drawings to be used in the descriptions of the embodiments or the prior art are briefly introduced as follows. Obviously, the following drawings just illustrate some embodiments of the present invention, and a person skilled in the art can obtain other drawings from these drawings without paying a creative effort.

DETAILED DESCRIPTION OF THE PREFERRED EMBODIMENTS

In order to make the object, technical solutions and advantages of the embodiments of the present invention be clearer, the technical solutions of the embodiments of the present invention will be clearly described as follows with reference to the drawings. Apparently, the described embodiments are just a part of embodiments of the present invention rather than all the embodiments. Based on the embodiments of the present invention, any other embodiment obtained by a person skilled in the art without paying a creative effort will fall within the protection scope of the present invention.

Figure 1A:
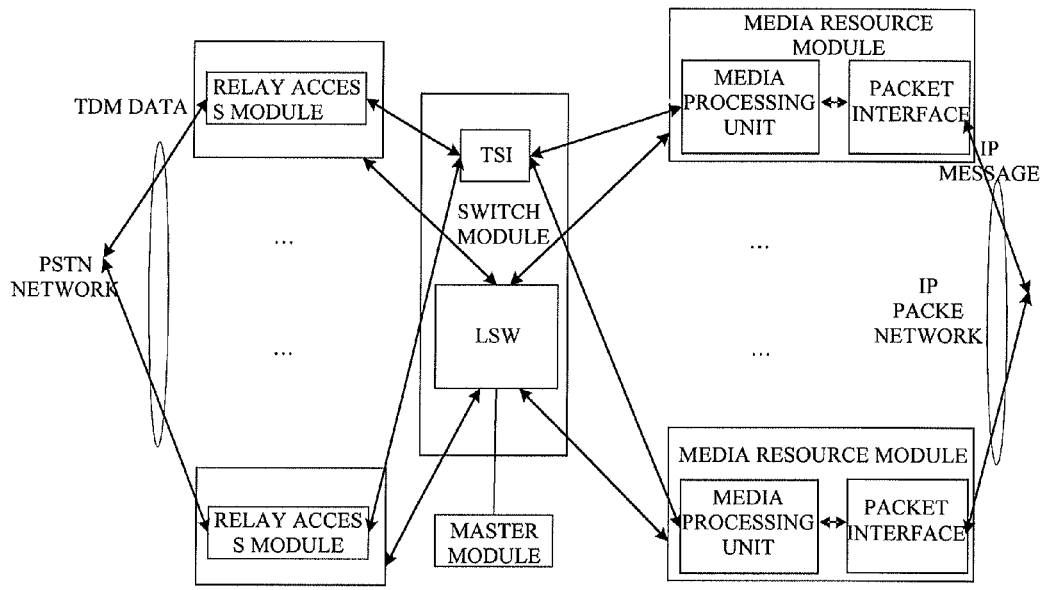
FIG. 1A is a schematic diagram of the working principle of a media gateway in the prior art.
Figure 1B:
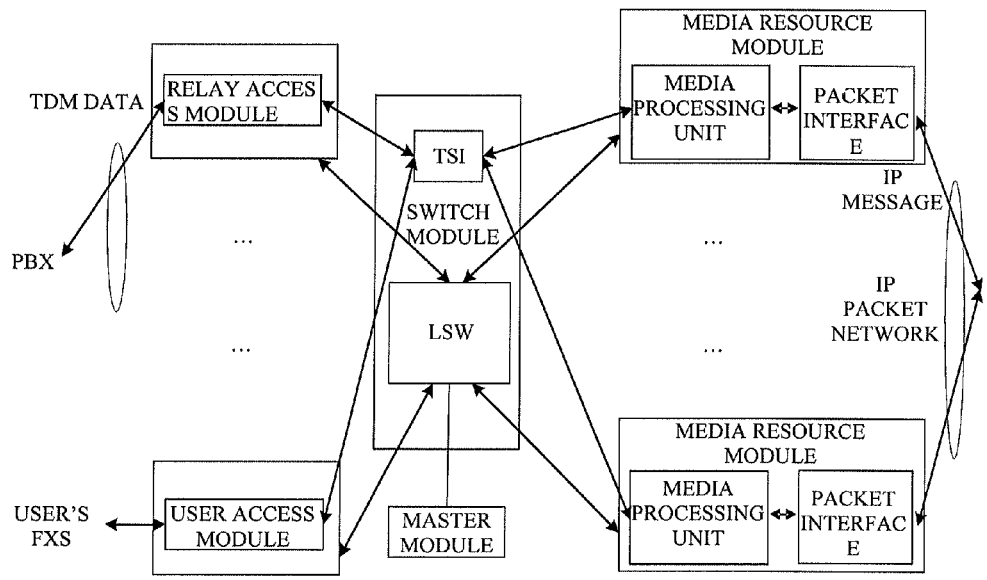
FIG. 1B is a schematic diagram of the working principle of another media gateway in the prior art.
Figure 2:
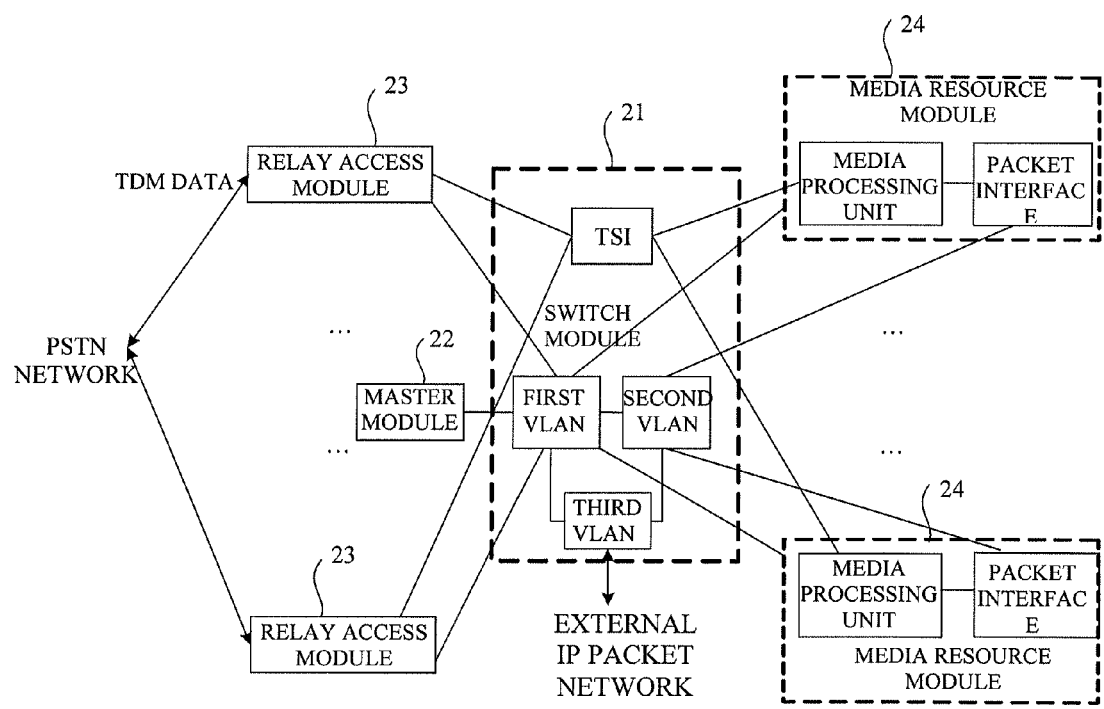
FIG. 2 is a structure diagram of a media gateway device provided by an embodiment of the present invention.

FIG. 2 is a structure diagram of a media gateway device provided by an embodiment of the present invention. As illustrated in FIG. 2, the media gateway device of this embodiment includes: a switch module 21, a master module 22, at least one relay access module 23 and at least one media resource module 24. Herein, the master module 22, the relay access module 23 and the media resource module 24 are connected to the switch module 21, respectively. The media gateway device is connected to the PSTN or the PBX through the relay access module 23, so as to receive the TDM data of the PSTN or the PBX, form a data frame through the media resource module 24 and forward the data frame to the external Internet Protocol (IP) packet network.

Specifically, according to interface functions, the switch module 21 classifies interfaces thereon into three independent Virtual Local Area Networks (VLANs), i.e., a first VLAN, a second VLAN and a third VLAN, respectively. Herein, the interfaces of the first VLAN are connected to the master module 22, the relay access module 23 and the media resource module 24, respectively, so as to realize the internal communications of the media gateway device, e.g., the modules perform interactions of various management messages through the first VLAN. Meanwhile, the master module 22 is also responsible for controlling and managing the relay access module 23, the media resource module 24 and the switch module 21 through the first VLAN. The interfaces of the second VLAN are mainly connected to the media resource module 24, so as to receive or transmit a data frame from or to the media resource module 24. The interfaces of the third VLAN are mainly connected to an external IP packet network, so as to receive or transmit a data frame from or to the external IP packet network.

In this embodiment, the media gateway device further includes a network layer static routing table (not illustrated). Herein, the network layer static routing table is preset in the media gateway device according to the classification of the VLAN, and it stores Media Access Control (MAC) addresses allocated for the second and third VLANs, respectively, as well as an MAC address and an IP address corresponding to the media resource module 24, so that the switch module 21 or the media resource module 24 re-encapsulates the data frame to be forwarded.

Herein, the switch module 21 is configured to forward, through the third and second VLANs, a data frame (i.e., a first data frame) of the external IP packet network to the media resource module 24 for a processing, according to MAC addresses corresponding to the second and third VLANs as well as an MAC address and an IP address corresponding to the media resource module 24 in the network layer static routing table. The media resource module 24 is configured to receive the first data frame forwarded by the switch module 21, convert the first data frame into TDM data and forward the TDM data to the relay access module 23, so that the relay access module 23 forwards the TDM data to the TDM domain. The media resource module 24 is further configured to forward, through the second and third VLANs, a second data frame corresponding to the relay access module 23 to the external IP packet network, according to the MAC addresses corresponding to the second and third VLANs as well as the MAC address and the IP address corresponding to the media resource module 24 in the network layer static routing table.

Specifically, the switch module 21 receives the first data frame of the external IP packet network through the third VLAN, re-encapsulates the first data frame according to the address information stored in the network layer static routing table, and forwards the re-encapsulated first data frame to the media resource module 24 through the second VLAN. According to the address information stored in the network layer static routing table, the media resource module 24 converts the TDM data of the circuit domain forwarded by the relay access module 23 into IP packet data and encapsulates the IP packet data to form a second data frame, then forwards the second data frame to the switch module 21, so that the switch module 21 forwards the second data frame to the external IP packet network. Herein, the process of "re-encapsulate" mainly means translating the MAC address and the IP address of the data frame.

In the media gateway device of this embodiment, each media resource module forwards the data frames to the switch module, and the interface of the third VLAN of the switch module uniformly forwards the data frames to the external IP packet network. In addition, the interface of the third VLAN of the switch module uniformly receives data frames transmitted by the external IP packet network, and forwards the data frames to the media resource module for a processing. The media resource module no longer provides any interface connected to the external IP packet network, instead, only the interface of the third VLAN of the switch module is connected to the external IP packet network. A person skilled in the art will be appreciated that on the switch module, the number of the interfaces connected to the external IP packet network is limited, and preferably set as one or two. As compared with the prior art, the media gateway device of this embodiment substantially reduces the number of the external interfaces, so it is easy to maintain the external interfaces. In addition, the reduction of the number of the external interfaces decreases to some extent the probability of an attack on the media gateway device by the external IP packet network, and improves the security of the media gateway device. Further, in this embodiment, since the interfaces of the switch module are managed through the VLANs, the data frame in one VLAN will not be forwarded to other different VLAN.

Thus, when a data frame of the external IP packet network received by the third VLAN has no access authority or does not meet an access authority preset by the third VLAN, the data frame will not be forwarded to the second VLAN. Therefore, other modules in the media gateway device will not be influenced, and the security of the media gateway device can be further improved.

Based on the above embodiment, the media resource module 24 may include a media processing unit and a packet interface connected thereto. Herein, the packet interface is connected to the switch module 21 through the second VLAN. Specifically, the packet interface may be connected to an interface of the second VLAN on the switch module 21 through a backboard of the media gateway device. In addition to various interfaces, the switch module 21 further includes a time slot interchange (TSI) circuit connected to the relay access module 23 and media processing unit, respectively, so as to switch the data of the circuit domain transmitted by the relay access module 23 to the media processing unit of the media resource module 24. The media processing unit receives the TDM data forwarded by the relay access module 23, converts the data of the circuit domain into the second data frame of the IP network by calling an interface function, and transmits the second data frame to the packet interface. The packet interface receives the second data frame transmitted by the media processing unit and forwards the second data frame to the switch module 21. In addition, the packet interface is further configured to receive the first data frame transmitted by the switch module 21, and forward the first data frame to the media processing unit for a processing. Herein, the media processing unit is specifically configured to call the interface function, convert the first data frame into the TDM data by performing a format conversion on the first data frame, and forward the TDM data to the circuit domain through the relay access module 23.

Figure 3:
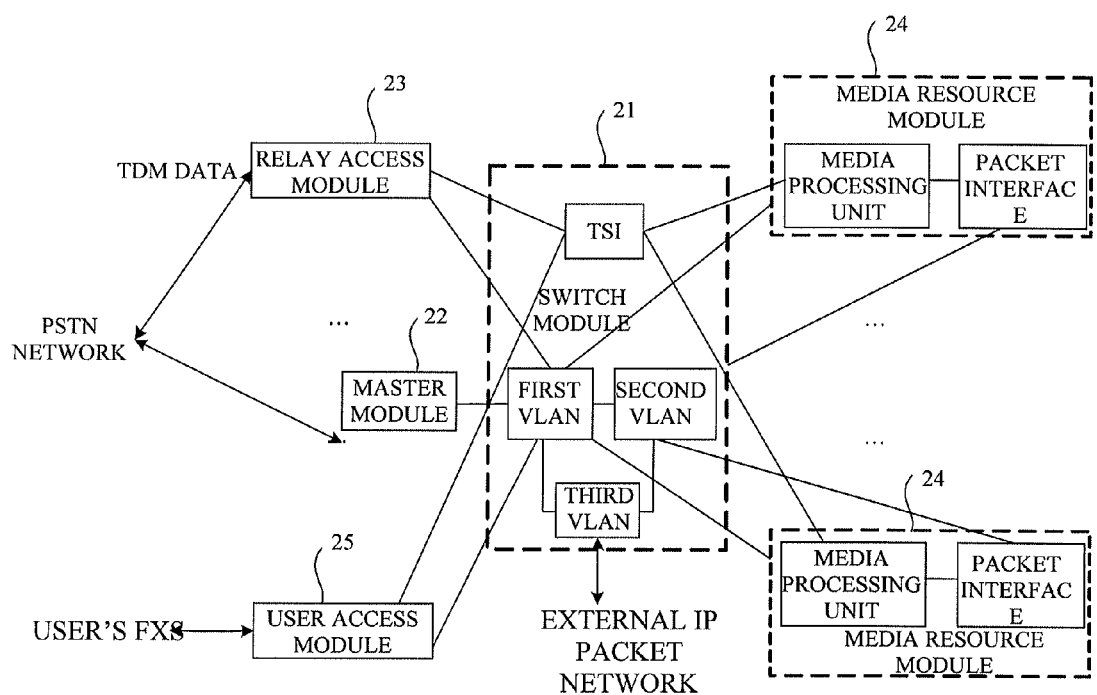
FIG. 3 is a structure diagram of a media gateway device provided by another embodiment of the present invention.

FIG. 3 is a structure diagram of a media gateway device provided by another embodiment of the present invention. This embodiment is implemented based on the above embodiment. As illustrated in FIG. 3, the media gateway device of this embodiment further includes at least one user access module 25 connected to the switch module 21, particularly to the TSI circuit in the switch module 21 through the first VLAN.

Specifically, the media gateway device is connected to the FXS through the user access module 25, so as to receive the TDM data of the user side connected to the FXS. The TDM data is switched to the media resource module 24 through the TSI circuit of the switch module 21, converted into a data frame of the IP network by the media processing unit of the media resource module 24, forwarded to the switch module 21 through the packet interface, and forwarded to the external IP packet network by the switch module 21 through the interface of the third VLAN. In addition, the user access module is further configured to receive the first data frame forwarded by the media processing unit of the media resource module. Specifically, the user access module receives the TDM data converted from the first data frame by the media processing unit, and transmits the TDM data to the user side network.

In the media gateway device of this embodiment, the data frames are uniformly forwarded by the interface of the third VLAN of the switch module, and the packet interface of the media resource module is no longer connected to the external IP packet network, thereby reducing the number of the external interfaces of the media gateway device, facilitating maintenance of the external interfaces, and decreasing the probability of an attack on the media gateway device by the external IP packet network. In addition, the media gateway device performs a packet management of the interfaces of the switch module through the VLAN technology, and processes data frames outside the media gateway device and data frames entering the media gateway device, respectively, through different VLANs, i.e., sufficiently utilizes the characteristic that the data frame in one VLAN will not be forwarded to other different VLAN in case the data frame has no or does not meet the access authority, thereby achieving the isolation between the external and internal communications of the media gateway device, and further ensuring the security of the media gateway device.

Figure 4:
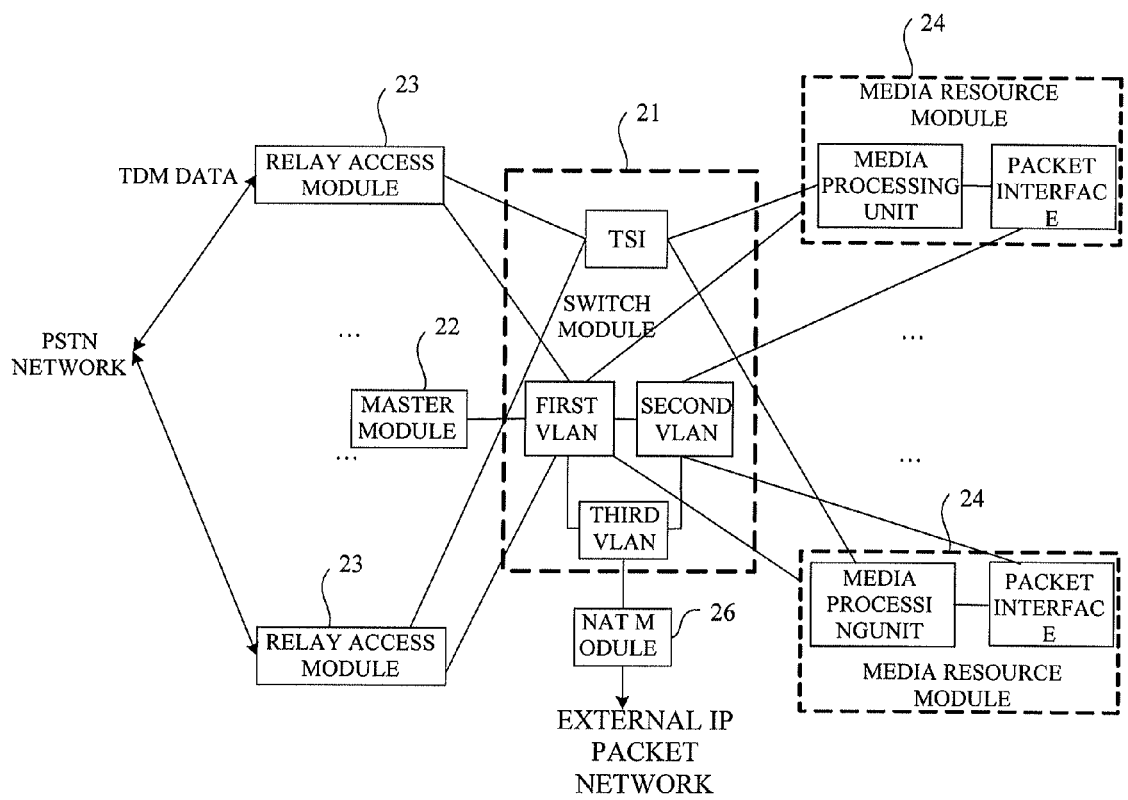
FIG. 4 is a structure diagram of a media gateway device provided by still another embodiment of the present invention.

FIG. 4 is a structure diagram of a media gateway device provided by still another embodiment of the present invention. This embodiment is implemented based on the above embodiment. As illustrated in FIG. 4, the media gateway device of this embodiment further includes a Network Address Translation (NAT) module 26 connected to the switch module 21 through the interface of the third VLAN of the switch module, so as to provide the media gateway device with an external interface connected to the external IP packet network. In addition, the NAT module 26 is further configured to translate the IP address corresponding to the media resource module (i.e., the IP address of the packet interface of the media resource module) in the data frame and the external IP address into each other. Herein, the external IP address is an IP address preset for the media gateway device, and its format is corresponding to the external IP packet network.

Herein, the IP address of the packet interface in this embodiment is a private IP address (also referred to as reserved IP address), while the external IP address of the media gateway device is a standard IP address of the Wide Area Network (WAN) (also referred to as public network IP address). The NAT module 26 of this embodiment is mainly configured to translate an internal private IP address into a public network IP address, in the mode of static translation, dynamic translation or port multiplexing forwarding. The NAT module 26 may be specifically implemented by, but not limited to, a Central Processing Unit (CPU) or a Field-Programmable Gate Array (FPGA) circuit.

In the media gateway device of this embodiment, the IP addresses of respective packet interfaces in the data frame may be replaced with a uniform external IP address by the NAT module, which is especially suitable to the scene requiring a uniform IP address of the media gateway device, and saves the resources of the public network IP addresses.

Further, the working principle of the NAT module is described as follows: when the NAT module receives a data frame in the out-of-node direction, i.e., the switch module transmits the data frame to the NAT module through the interface of the third VLAN, the NAT module shall translate the source IP address in the data frame from the IP address of the packet interface to the external IP address, and transmit the translated data frame to the external device through the interface in the NAT module connected to the external IP packet network. In which, please refer to subsequent descriptions of the working principle of the media gateway device for other operation flows when the media gateway device forwards the data frame in the out-of-node direction, which are omitted here.

When receiving a data frame transmitted from the external device in the external IP packet network, the NAT module shall translate a destination IP address of the data frame from the external IP address into an IP address of the specific packet interface, and transmit the translated data frame to the switch module through the interface of the third VLAN. Next, the switch module may process the received data frame with reference to subsequent flow for the media gateway device to forward the data frames in the in-node direction, which is omitted here.

Herein, the NAT module may specifically translate the external IP address and the IP address of the packet interface according to the pre-stored correspondence relationships among port numbers corresponding to respective packet interfaces, IP addresses of respective packet interfaces and the external IP address, but the present invention is not limited thereto. For example, when receiving a data frame transmitted by the external device, the NAT module inquires a translation table that stores the correspondence relationships between port numbers and IP addresses according to the destination IP address and port number in the data frame, so as to obtain an IP address of the packet interface of the media resource module processing the data frame, and replace the destination IP address in the data frame with the IP address of the packet interface. When receiving the data frame forwarded by the packet interface, the NAT module inquires the translation table according to the destination IP address and port number in the data frame, so as to obtain an external IP address of the media gateway device, and replace the destination IP address in the data frame with the external IP address.

Figure 5:
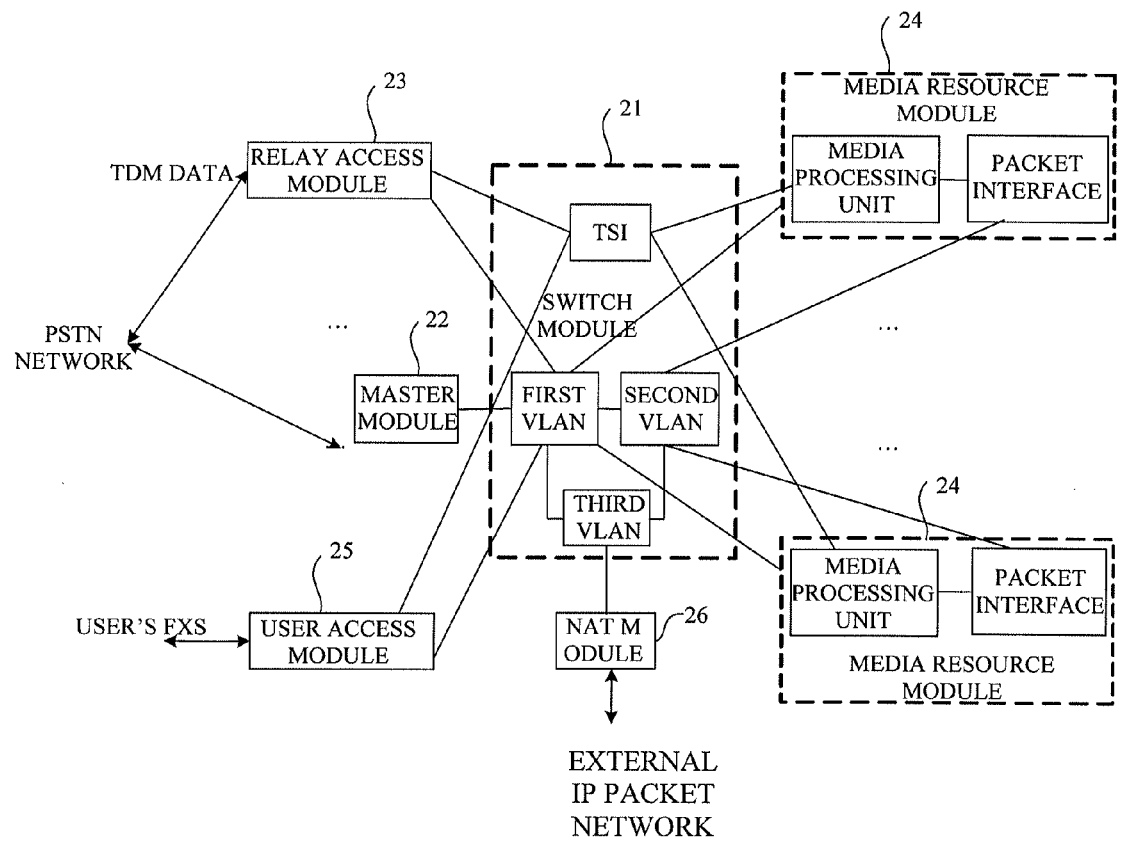
FIG. 5 is a structure diagram of a media gateway device provided by yet another embodiment of the present invention.

FIG. 5 is a structure diagram of a media gateway device provided by yet another embodiment of the present invention. As illustrated in FIG. 5, the media gateway device of this embodiment differs from that as illustrated in FIG. 4 in further including a user access module 25. Please refer to the above embodiments for the structures and functions of the NAT module 26 and other modules of the media gateway device of this embodiment, which is omitted here.

The following embodiments will describe the working flow for the media gateway device provided by the above embodiments to forward the data frames in the in-node and out-of-node directions, respectively.

In the in-node direction, i.e., the direction from the IP network to the circuit domain (including PSTN network, PBX, etc.), the flow for the media gateway device to forward the data frames is as follows:

The switch module receives a first data frame transmitted by an external device in an external IP packet network through the third VLAN. The destination MAC address of the first data frame is an MAC address corresponding to the third VLAN. The source MAC address of the first data frame is an MAC address of the external device. The source IP address of the first data frame is an IP address of the external device. And the destination IP address of the first data frame is an IP address of the packet interface of the media resource module.

According to the network layer static routing table, the switch module translates the destination MAC address of the first data frame into the MAC address of the packet interface, and translates the source MAC address of the first data frame into the MAC address corresponding to the second VLAN, so as to re-encapsulate the first data frame. Next, the re-encapsulated first data frame is forwarded to the packet interface of the media resource module through the second VLAN, so that the packet interface forwards the re-encapsulated first data frame to the media processing unit for a processing.

In the out-of-node direction, i.e., the direction from the circuit domain (including PSTN network, PBX, etc.) to the external IP packet network, the flow for the media gateway device to forward the data frames is as follows:

The media resource module receives the TDM data forwarded by the relay access module through the media processing unit, encapsulate the TDM data as a second data frame according to the network layer static routing table, and forwards the second data frame to the packet interface. The destination MAC address of the second data frame is an MAC address corresponding to the second VLAN. The source MAC address of the second data frame is an MAC address of the packet interface. The source IP address of the second data frame is an IP address of the packet interface. And the destination IP address of the second data frame is an IP address of the external device.

The media resource module uses its packet interface to forward the second data frame to the switch module via the second VLAN.

According to a pre-produced network layer dynamic routing table, the switch module translates the destination MAC address of the second data frame into the MAC address of the external device, and translates the source MAC address of the second data frame into the MAC address corresponding to the third VLAN, so as to re-encapsulate the second data frame. Next, the switch module forwards the re-encapsulated second data frame to the external device for a processing through the third VLAN.

In the method for the media gateway device of this embodiment to forward data frames, data frames from the external device are uniformly received by the interface of the third VLAN of the switch module, and forwarded to the media resource modules for a processing through the interface of the second VLAN; or data frames of respective media resource modules are received through the second VLAN, and uniformly forwarded to the external IP packet network through the interface of the third VLAN. Thus the data frames can be forwarded under the condition that the packet interfaces of the media resource modules are not directly connected to the external IP packet network, and the security of the media gateway device is ensured during the data frame forwarding process by reducing the number of the external interfaces of the media gateway device. In addition, in the method for forwarding data frames in this embodiment, the forwarding of data frames between the external IP packet network and the media gateway device and the forwarding of data frames inside the media gateway device are carried out in different VLANs, respectively. By utilizing the characteristic that different VLANs are isolated from each other, data frames that have no or do not meet the access authority are processed in their respective VLANs, thereby achieving the isolation between the internal and external communications of the media gateway device, and improving the security of the media gateway device.

Based on the above media gateway device, the following embodiment provides a method for forwarding data frames, including:

in the in-node direction: the switch module forwards, through the third and second VLANs, a first data frame of the external IP packet network to the media resource module for a processing, according to MAC addresses corresponding to the second and third VLANs as well as an MAC address and an IP address corresponding to the media resource module in the network layer static routing table;

in the out-of-node direction: the media resource module forwards, through the second and third VLANs, a second data frame corresponding to the relay access module to the external IP packet network, according to the MAC addresses corresponding to the second and third VLANs as well as the MAC address and the IP address corresponding to the media resource module in the network layer static routing table.

Figure 6A:
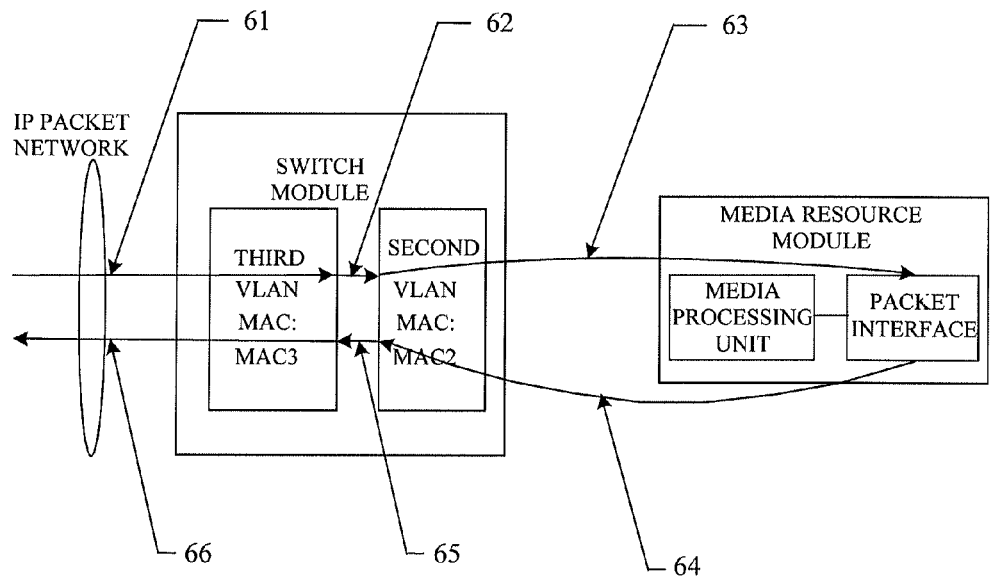
FIG. 6A is a flow diagram in which a media gateway device provided by an embodiment of the present invention forwards data frames.
Figure 6B:
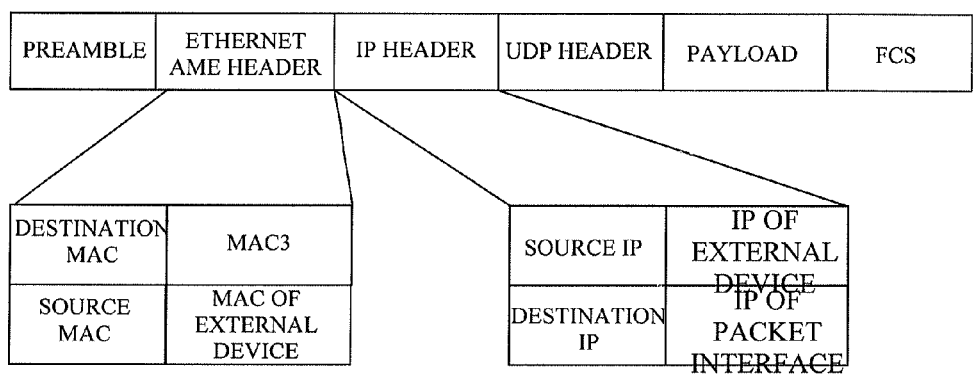
FIGS. 6B-6E are state diagrams of data frames in the process of forwarding the data frames by a media gateway device provided by an embodiment of the present invention.

The flows of forwarding the data frames are further described as follows in conjunction with the media gateway devices as illustrated in FIGS. 2 and 3. FIG. 6A is a flow diagram in which a media gateway device provided by an embodiment of the present invention forwards data frames. FIGS. 6B to 6E are state diagrams of data frames in the process of forwarding the data frames by a media gateway device provided by an embodiment of the present invention. As illustrated in FIG. 6A, the process of forwarding the data frames along the in-node direction by the media gateway device of this embodiment includes:

Step 61: the switch module receives a data frame (i.e., a first data frame) transmitted by the external device in the external IP packet network through the interface of the third VLAN. The data frame may be encapsulated in any message format supported by the IP packet network, such as an RTP message or an RTCP message. Usually, the RTP message or the RTCP message is carried in a User Datagram Protocol (UDP) message and used as payload information of the UDP message. In the example of this embodiment, the data frame is the UDP message, and as illustrated in FIG. 6B, the format of the data frame specifically includes a preamble field, an Ethernet frame header field, an IP header field, a UDP header field, a payload field and a Frame Check Sequence (FCS) field. In which, the Ethernet frame header field includes MAC address information of the data frame; the IP header field includes IP address information of the UDP message; and the UDP header field mainly includes port information corresponding to the UDP message. In this embodiment, the source MAC address of the data frame is the MAC address of the external device and the destination MAC address is the MAC address of the third VLAN (i.e., MAC3). The source IP address of the data frame is the IP address of the external device and the destination IP address is the IP address of the packet interface.

Figure 6C:
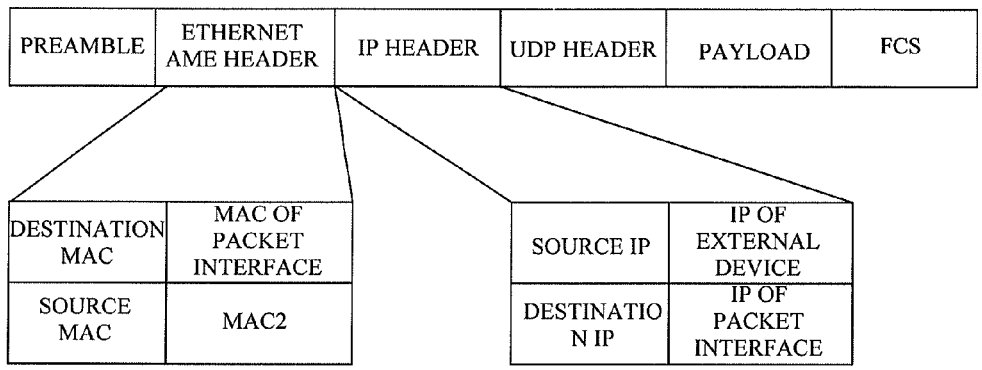

Step 62: the switch module analyzes the data frame to obtain destination IP address of the data frame, inquires a pre-stored network layer static routing table according to the obtained destination IP address, translates the destination MAC address of the data frame into an MAC address of the packet interface of the media resource module, translates the source MAC address into an MAC address of the second VLAN (i.e., MAC2), and re-encapsulates the data frame. In that case, the format of the data frame is as illustrated in FIG. 6C, in which, the structure of the network layer static routing table is as illustrated in Table 1. The network layer static routing table specifically stores the correspondence relationships among the IP address of the packet interface, the identifier (e.g., physical port number) of the interface of the second VLAN of the switch module connected to the packet interface, the MAC address of the packet interface and the MAC address of the second VALN.

TABLE 1

| Destination IP address of the message | Switching to the interface of the switch module | Destination MAC when the message is encapsulated | Source MAC when the message is encapsulated | Remarks |
| --- | --- | --- | --- | --- |
| IP address of the packet interface | Identifier (e.g., physical port number) | MAC address of the packet interface | MAC address of the second VLAN | Static accurate |

TABLE 1-continued

| Destination IP address of the message | Switching to the interface of the switch module | Destination MAC when the message is encapsulated | Source MAC when the message is encapsulated | Remarks |
| --- | --- | --- | --- | --- |
| of the media resource module | of the interface of the switch module which is connected to the packet interface in the second VLAN | | | matching |

Step 63: the switch module forwards the re-encapsulated data frame to the packet interface of the media resource module through the second VLAN; the packet interface receives the data frame and judges whether the MAC address of the data frame is consistent with the MAC address of the packet interface; if yes, the packet interface forwards the data frame to the media processing unit, which processes the UDP message by calling the interface function, e.g., performing a code format conversion that converts the UDP message into the TDM data in the circuit domain.

Herein, the process for the switch module to forward data frame to the media resource module is a forwarding inside the media gateway device, thus the switch module can forward the data frame to the media resource module just by translating the MAC address of the data frame through the network layer static routing table.

Further, after the data frame is forwarded to the media processing unit for a processing, the subsequent operation on the data frame may be performed using the existing flow of data frame processing. For example, the media processing unit may switch, through the TSI circuit of the media resource module, the TDM data generated in the processing to the relay access module or the user access module, which transmits the TDM data to the circuit domain, such as the PSTN or the PBX. To be noted, the processing of the data frame by the media processing unit and the subsequent operation on the data frame are not limited to the above manner, and may be specifically determined based on the actual application requirement.

Figure 6D:
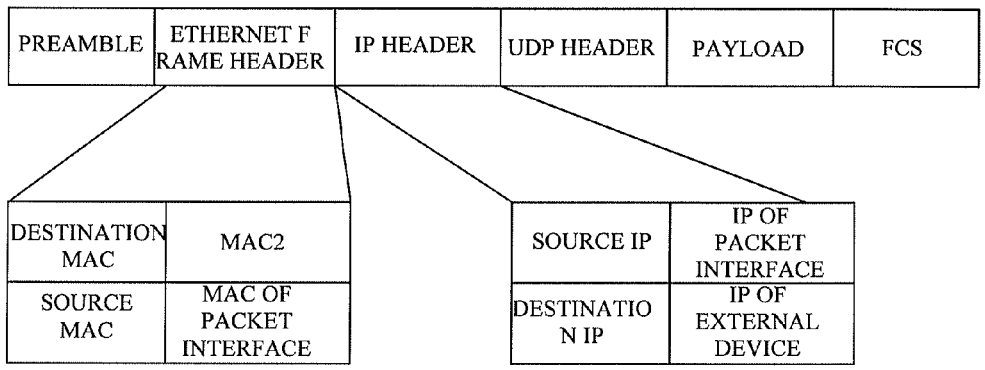

Further, with reference to FIG. 6A, the process of forwarding the data frames along the out-of-node direction by the media gateway device of this embodiment includes:

Step 64: the relay access module and/or the user access module receives the TDM data of the circuit domain, and switches the TDM data to the media processing unit of the media resource module through the TSI circuit inside the switch module; the media processing unit receives the TDM data, performs code format conversion of the TDM data by calling the interface function, and encapsulates the TDM data as a data frame of the IP network according to the network layer static routing table as shown in Table 1; wherein the media processing unit may encode the TDM data according to the standard such as G.711, G.723, G.726, G.729 or T.38, and encapsulate the TDM data as a message. The media processing unit forwards the message (i.e., the data frame) formed by encapsulation to the switch module through the packet interface. In the example of this embodiment, the data frame is the UDP message. In which, the media processing unit encapsulates the TDM data as an RTP message or an RTCP message used as payload information of the UDP message, and encapsulates corresponding UDP message header information, as illustrated in FIG. 6D. In FIG. 6D, the data frame also includes a preamble field, an Ethernet frame header field, an IP header field, a UDP header field, a payload field and an FCS field. In this embodiment, the destination MAC address of the data frame is the MAC address of the second VLAN (i.e., MAC2), and the source MAC address is the MAC address of the packet interface of the media resource module, i.e., the MAC address of the packet interface that forwards the data frame. The source IP address of the data frame is the IP address of the packet interface, and the destination IP address is the IP address of the external device. The forwarding process is performed between the modules inside the media gateway device, and belongs to the second layer forwarding process and specifically may be performed based on the MAC address table.

Figure 6E:
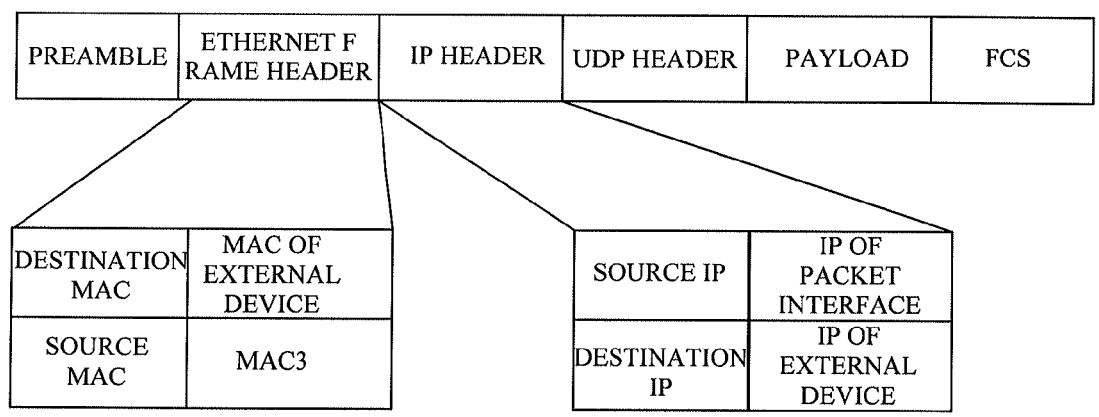

Step 65: according to the network layer dynamic routing table, the switch module translates the destination MAC address of the received data frame into the MAC address of the external device, translates the source MAC address of the data frame into the MAC address (MAC 3) corresponding to the third VLAN (i.e., the MAC address of the interface on the switch module which is connected to the external IP packet network), re-encapsulates the data frame and transmits to the third VLAN. In that case, the format of the data frame is as illustrated in FIG. 6E. Specifically, the switch module may inquire the network layer dynamic routing table according to the IP address of the external device (i.e., the destination IP address) in the data frame, so as to obtain the encapsulation information required for forwarding, and forward the MAC address of the data frame.

Herein, the network layer dynamic routing table is generated by the master module of the media gateway device and stored in the switch module. The structure of the network layer dynamic routing table is as shown in Table 2. The network layer dynamic routing table stores the information such as the IP address of the external device, the MAC address of the external device, the MAC address of the third VLAN, and the identifier of the interface of the third VLAN of the switch module (i.e., the interface connected to the external IP packet network interface).

TABLE 2

| Destination IP address of the message | Switching to the interface of the switch module | Destination MAC when the message is encapsulated | Source MAC when the message is encapsulated | Remarks |
|---|---|---|---|---|
| IP address of the external device | Identifier (e.g., physical port number) of the interface of the switch module which is connected to the packet interface in the third VLAN | MAC address of the external device | MAC address of the third VLAN | Dynamic accurate matching |

Step 66: the switch module forwards the re-encapsulated data frame to the external device in the external IP packet network through the third VLAN, so that the external device processes the data frame.

As can be seen from the above flow for the media gateway device to forward the data frames, the media gateway device of this embodiment connects the packet interfaces of respective media resource modules with the interfaces of the switch module, and data frames of respective media resource modules are concentratedly and uniformly forwarded by the interface on the switch module which is connected to the external IP packet network, thus the packet interfaces of respective media resource modules no longer need to be connected to the external IP packet network, which reduces the external interfaces of the media gateway device, and facilitates the maintenance of the external interfaces. As a result, fewer interfaces on the media gateway device are exposed to the external IP packet network, which decreases the probability of an attack, a deception or a broadcast storm on the media gateway device by the external IP packet network, and improves the security of the media gateway device. In addition, this embodiment divides and manages the interfaces of the switch module through the VLANs, processes the data frames outside and inside the media gateway device, respectively, through different VLANs, and realizes the isolation between the external and internal communications by using the isolation characteristics of the VLANs, e.g., when receiving a data frame not meeting the preset access authority, the third VLAN may directly discard the data frame rather than forwarding to the second VLAN, thus the attack path is shut off and the security of the media gateway device is further improved.

Further, as compared with the technical solution of the prior art where the packet interface forwards the data frames with a Lan Switch (LSW) chip, the media gateway device of this embodiment presets a static routing table, and forwards the data frames inside the media gateway device using the network layer static routing table, thus the process of MAC address study is not existed. As a result, in case of MAC address aging, the data frames will not be broadcast to all the interfaces even under the special circumstances such as one-way data frames, Virtual Router Redundancy Protocol (VRRP) or Hot Standby Routed Protocol (HSRP), and the problem of broadcast storm will not appear. Therefore, the media gateway device of this embodiment has a higher reliability.

Further, as compared with the technical solution of the prior art which converges respective packet interfaces through a special L3 switchboard, the media gateway device of this embodiment saves the specially arranged L3 switchboard, reduces the network layers, and decreases the complexity and cost of the network arrangement while converging respective packet interfaces. Further, in the existing technical solution of arranging the L3 switchboard, the network communication is usually limited by the L3 switchboard. For example, as a direct result of the failure of the L3 switchboard, the media gateway device will not work normally. According to relevant statistics, currently the network failure caused by other device is the main reason why the media gateway device cannot be used normally. It is clear that the reliability of the media gateway device of this embodiment is obviously higher than that of the technical solution of the prior art.

In which, technical conditions are provided to implement the media gateway device of this embodiment by the increasingly richer functions of the LSW chip, the enhancement of the bandwidth capacity of the backboard, and the development of corresponding message encapsulation technology. Usually, the LSW chip integrates the functions of L3 switch, Double VLAN (also referred to as QinQ), Operation, Administration and Maintenance (OAM), Port Security, Access Control List (ACL) and clock synchronization. The backboard bandwidth of the existing media gateway device also reaches GE level, and supports encapsulating each channel of IP data in 20 ms and G.711 format. The bandwidth of each channel of IP data is only 95.2 Kbps. That is, the prior art has had the basic conditions for the media gateway device of this embodiment to perform a concentrated forwarding.

Based on the above embodiments, when the media gateway device includes the NAT module, the process for the switch module to receive the first data frame transmitted by the external device in the external IP packet network through the third VLAN is as follows: the switch module receives the first data frame through the third VLAN after the NAT module translates the destination IP address from the external IP address of the media gateway device into the IP address of the packet interface of the media resource module. Specifically, the NAT module receives the first data frame transmitted by the external device, and translates the destination IP address of the first data frame from the external IP address of the media gateway device into the IP address of the packet interface of the media resource module; and the NAT module transmits the translated first data frame to the switch module through the interface of the third VLAN of the switch module.

Further, in the above embodiments, the process for the switch module to forward the re-encapsulate second data frame to the external device for a processing is specifically as follows: the switch module transmits the re-encapsulate second data frame to the NAT module, which translates source IP address of the re-encapsulate second data frame from the IP address of the packet interface to the external IP address of the media gateway device. Next, the translated second data frame is forwarded to the external device for a processing through the external interface provided by the NAT module.

Specifically, according to the pre-stored correspondence relationships among the port numbers corresponding to the packet interfaces of the media resource module, the IP addresses of the packet interfaces and the external IP address, the NAT module may translate the destination IP address in the first data frame from the external IP address of the media gateway device into the IP address of the packet interface of the media resource module, or translate the IP address of the source IP address packet interface in the second data frame into the external IP address of the media gateway device, but the present invention is not limited thereto.

Further, based on the above embodiments, the method also includes: the master module generates a network layer dynamic routing table. Specifically, a Media Gateway Controller (MGC) transmits routing information to the master module of the media gateway in a form of signaling (e.g., Session Initiation Protocol (SIP) signaling). The master module performs operations such as generation, modification and deletion of the network layer dynamic routing table according to the received routing information, and writes the network layer dynamic routing table into the switch module for a usage.

In the method for forwarding data frames according to a embodiment of the present invention, the IP addresses of respective packet interfaces in the data frame may be replaced with a uniform external IP address by the NAT module, which is especially suitable to the scene requiring a uniform IP address of the media gateway device, and saves the resources of the public network IP addresses.

Figure 7A:
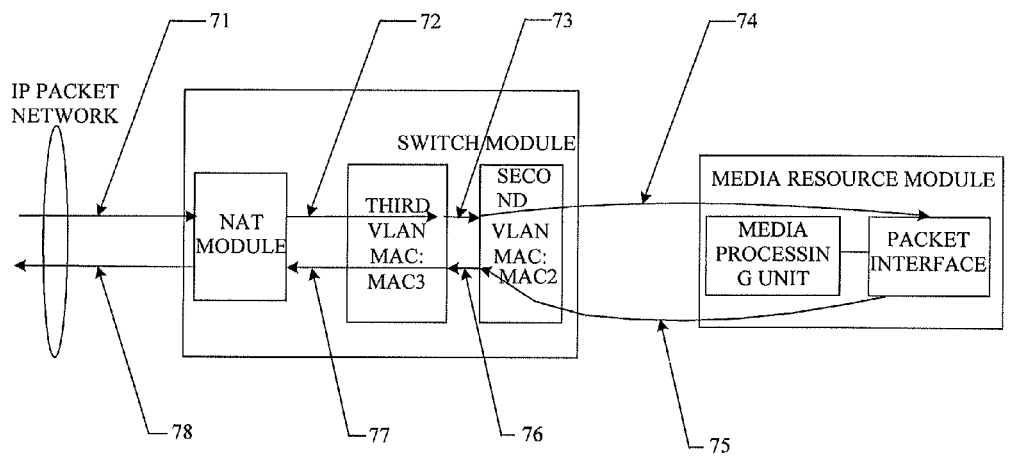
FIG. 7A is a flow diagram in which a media gateway device provided by another embodiment of the present invention forwards data frames.
Figure 7B:
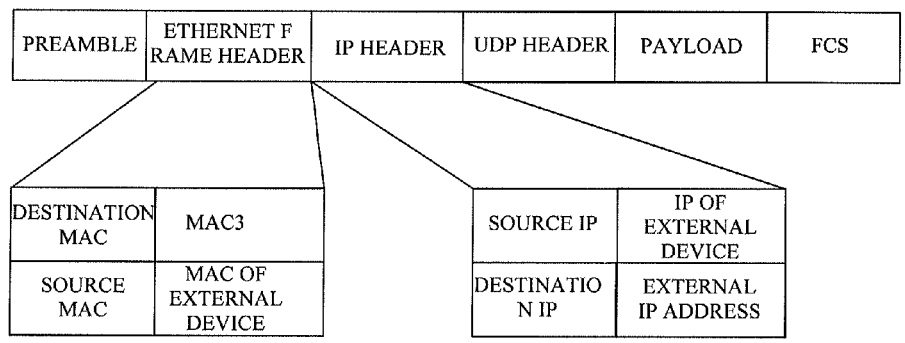
FIGS. 7B and 7C are state diagrams of data frames in the process of forwarding the data frame by the media gateway device provided by the another embodiment of the present invention.
Figure 7C:
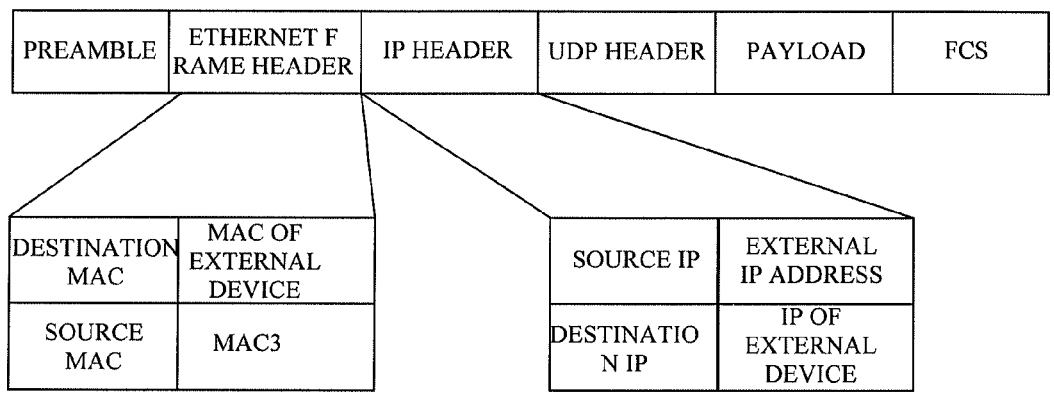

The flow of forwarding data frames will be further described as follows with reference to the media gateway device as illustrated in FIGS. 4 and 5. FIG. 7A is a flow diagram in which a media gateway device provided by another embodiment of the present invention forwards data frames. FIGS. 7B and 7C are state diagrams of data frames in the process of forwarding the data frames by the media gateway device provided by another embodiment of the present invention. This embodiment may be implemented based on the previous embodiment, and the same contents are omitted. As illustrated in FIG. 7A, the process of forwarding data frames along the in-node direction by the media gateway device of this embodiment includes:

Step 71: the NAT module receives a data frame (i.e., a first data frame) transmitted by the external device in the external IP packet network, and in this embodiment, the UDP message is taken as an example. Herein, the format of the data frame is specifically illustrated in FIG. 7B. The data frame also includes a preamble field, an Ethernet frame header field, an IP header field, a UDP header field, a payload field and an FCS field. In this embodiment, the source MAC address of the data frame is the MAC address of the external device and the destination MAC address is the MAC address of the third VLAN (i.e., MAC3). The source IP address of the data frame is the IP address of the external device and the destination IP address is the external IP address of the media gateway device.

Step 72: the NAT module obtains port information in the data frame through an analysis, translates the destination IP address of the data frame from the external IP address into an IP address of the packet interface, according to the pre-stored correspondence relationships among port numbers corresponding to the packet interfaces, IP addresses of the packet interfaces and the external IP address, and transmits the address translated data frame to the switch module through the third VLAN. In that case, the format of the data frame is as illustrated in FIG. 6B.

Step 73: according to the network layer static routing table, the switch module translates the destination MAC address of the data frame into an MAC address of the packet interface of the media resource module, translates the source MAC address into an MAC address (i.e., MAC3) of the second VLAN, and re-encapsulates the data frame. In that case, the format of the data frame is as illustrated in FIG. 6C.

Step 74: the switch module forwards the re-encapsulated data frame to the packet interface of the media resource module through the second VLAN, and the packet interface forwards the data frame to the media processing unit for a processing.

In which, please refer to the descriptions of steps 62 and 63 for steps 73 and 74, which are omitted here.

Further, with reference to FIG. 7A, the process of forwarding data frames along the out-of-node direction by the media gateway device of this embodiment includes:

Step 75: the relay access module and/or the user access module receives the TDM data of the circuit domain, and switches the TDM data to the media processing unit of the media resource module through the TSI circuit inside the switch module; the media processing unit processes the TDM data to generate a data frame of the IP network, and forwards the data frame to the switch module through the packet interface; in which, the format of the data frame is as illustrated in FIG. 6D.

Step 76: according to the network layer dynamic routing table, the switch module translates the destination MAC address of the received data frame into the MAC address of the external device, translates the source MAC address of the data frame into the MAC address (i.e., MAC 3) corresponding to the third VLAN, re-encapsulates the data frame and transmits to the third VLAN. In that case, the format of the data frame is as illustrated in FIG. 6E.

In which, please refer to the descriptions of steps 64 and 65 for steps 75 and 76, which are omitted here.

Step 77: the switch module transmits the re-encapsulated data frame to the NAT module through the third VLAN;

Step 78: the NAT module performs an IP address translation for the received data frame by translating the source IP address in the data frame from the IP address of the packet interface into the external IP address, re-encapsulates the data frame and forwards to the external device in the external IP packet network for a processing. In that case, the format of the data frame is as illustrated in FIG. 7C.

As can be seen from the above content, in the method for forwarding data frames provided by the above embodiment, the data frames are uniformly forwarded by the switch module in the media gateway device through the interface in the third VLAN, so that the packet interfaces of respective media resource modules can be directly connected to the external IP packet network, thereby reducing the number of the external interfaces of the media gateway device, and saving a large amount of maintenance of the external interfaces. The above embodiment uses the VLAN technology to classify and manage the interfaces of the switch module, so that the forwarding operations on the data frames inside the media gateway device and from the media gateway device to the external device are performed in different VLANs, respectively, thereby achieving the isolation between the internal and the external communications of the media gateway device without using the interface isolation technology or additionally adding any network security device, which improves the security of the internal communication of the media gateway device, and increases the reliability of the whole media gateway device at a certain extent. The above embodiment performs the translation between the private IP address and the public network IP address through the NAT module, reduces the number of the required public network IP addresses, and saves the IP address resources. Further, in the above embodiment, the data frames may be forwarded to the external device according to the network layer static routing table, and the MAC address study is not existed, thereby avoiding the broadcast storm caused by the aging of the MAC address, and improving the reliability of the media gateway device in the process of data frame forwarding. Further in the above embodiment, the packet interfaces can be converged without specially arranging an L3 switchboard, so as to reduce the network layers as well as the complexity and cost of the network layout.

A person skilled in the art shall be appreciated that all or a part of steps for implementing the method embodiments may be completed by instructing relevant hardware through a program that may be stored in a computer readable storage medium. When the program is executed, the steps of the method embodiments are carried out. The storage medium may include various mediums capable of storing program codes, such as ROM, RAM, magnetic disk, or optical disk, etc.

Finally to be noted, the above embodiments are just used to describe the technical solutions of the present invention, rather than making limitations thereto. Although the present invention is detailedly described with reference to the above embodiments, a person skilled in the art can modify the technical solutions of the above embodiments, or equivalently replace some of the technical features, without causing the essence of a respective technical solution to deviate from the spirit and scope of the technical solution of each embodiment of the present invention.

What is claimed is:

1. A media gateway device, comprising: a master module, a switch module, at least one relay access module, and at least one media resource module; wherein the switch module comprises three independent Virtual Local Area Networks (VLANs): a first VLAN, a second VLAN, and a third VLAN; the relay access module, the master module and the media resource module are connected to the switch module through the first VLAN, the media resource module is further connected to the switch module through the second VLAN, and the switch module is connected to an external Internet Protocol (IP) packet network through the third VLAN;
wherein the media gateway device further comprises a network layer static routing table that is configured to store: a Media Access Control (MAC) address corresponding to the second VLAN, an MAC address corresponding to the third VLAN, as well as an MAC address and an IP address corresponding to the media resource module;
wherein the master module comprises a processor and a memory, wherein the processor is coupled to the memory comprising instructions which when executed by the processor cause the processor to perform a control management of the relay access module, the media resource module, and the switch module through the first VLAN;
the switch module comprises a Lan Switch Chip for forwarding, through the third and second VLANs, a first data frame of the external IP packet network to the media resource module for a processing, according to the MAC address corresponding to the second VLAN, the MAC address corresponding to the third VLAN, as well as the MAC address and the IP address corresponding to the media resource module in the network layer static routing table; and
wherein the media resource module comprises a digital signal processor and a memory, wherein the digital signal processor is coupled with the memory comprising instructions which when executed by the digital signal processor cause the digital signal processor to receive the first data frame and forward the first data frame to the relay access module; and to forward, through the second and third VLANs, a second data frame corresponding to the relay access module to the external IP packet network, according to the MAC address corresponding to the second VLAN, the MAC address corresponding to third VLAN, as well as the MAC address and the IP address corresponding to the media resource module in the network layer static routing table.

2. The media gateway device according to claim 1, further comprising a network address translation module that is connected to the switch module through the third VLAN and provides the media gateway device with an interface for connection with the external IP packet network; and
wherein the network address translation module comprises a processor and a memory, wherein the processor is coupled with the memory comprising instructions which when executed by the processor cause the processor to perform a mutual translation between the IP address in the first or second data frame corresponding to the media resource module and the external IP address corresponding to the external IP packet network.

3. The media gateway device according to claim 2, wherein the digital signal processor of the media resource module comprises a packet interface and a digital signal sub-processor;
wherein the packet interface is connected to the digital signal sub-processor, and connected to the switch module through the second VLAN; the packet interface is caused to receive the second data frame transmitted by the digital signal sub-processor and forward the second data frame to the switch module; and the packet interface is further caused to receive the first data frame transmitted by the switch module and forward the first data frame to the digital signal sub-processor; and
wherein the digital signal sub-processor is caused to receive and re-encapsulate the first data frame, and forward the first data frame to the relay access module; and the digital signal sub-processor is caused to generate the second data frame according to Time Division Multiplexing (TDM) data of the relay access module, and forward the second data frame to the packet interface.

4. The media gateway device according to claim 3, wherein the Lan Switch Chip of the switch module is further caused to receive the first data frame transmitted by an external device in the external IP packet network through the third VLAN, a destination MAC address of the first data frame is the MAC address corresponding to the third VLAN, wherein a source MAC address of the first data frame is an MAC address of the external device, a source IP address of the first data frame is an IP address of the external device, and a destination IP address of the first data frame is an IP address of a packet interface of the media resource module; and the Lan Switch Chip of the switch module is further caused to, in accordance with the network layer static routing table, translate the destination MAC address of the first data frame into an MAC address of the packet interface, translate the source MAC address of the first data frame into the MAC address corresponding to the second VLAN, re-encapsulate the first data frame, and forward the re-encapsulated first data frame to the packet interface through the second VLAN, so that the packet interface forwards the re-encapsulated first data frame to the digital signal sub-processor for a processing.

5. The media gateway device according to claim 3, wherein the digital signal processor of the media resource module is further caused to receive the TDM data of the relay access module through the digital signal sub-processor, encapsulate the TDM data as the second data frame according to the network layer static routing table, and forward the second data frame to the packet interface, wherein a destination MAC address of the second data frame is the MAC address corresponding to the second VLAN, a source MAC address of the second data frame is an MAC address of the packet interface, a source IP address of the second data frame is an IP address of the packet interface, and a destination IP address of the second data frame is an IP address of an external device in the external IP packet network; and the digital signal processor of the media resource module is further caused to forward the second data frame to the switch module through the packet interface via the second VLAN; and wherein the Lan Switch Chip of the switch module is further caused to, in accordance with a network layer dynamic routing table, translate the destination MAC address of the second data frame into an MAC address of the external device, translate the source MAC address of the second data frame into the MAC address corresponding to the third VLAN, re-encapsulate the second data frame, and forward the re-encapsulated second data frame to the external device through the third VLAN.

6. The media gateway device according to claim 4, wherein the Lan Switch Chip of the switch module is further caused to receive, through the third VLAN, the first data frame, the destination IP address of which has been translated from the external IP address into the IP address of the packet interface by the network address translation module.

7. The media gateway device according to claim 5, wherein the Lan Switch Chip of the switch module is further caused to transmit the re-encapsulated second data frame to the network address translation module, so that the network address translation module translates the source IP address of the re-encapsulated second data frame from the IP address of the packet interface into the external IP address, and forwards the translated second data frame to the external device.

8. The media gateway device according to claim 3, wherein the processor of the network address translation module is further caused to perform a mutual translation between the IP address in the first or second data frame corresponding to the media resource module and the external IP address, in accordance with a port number corresponding to the packet interface.

9. The media gateway device according to claim 5, wherein the processor of the master module is further caused to generate the network layer dynamic routing table, which comprises the IP address of the external device, the MAC address of the external device, and the MAC address corresponding to the third VLAN.

10. The media gateway device according to claim 1, further comprising:
at least one user access module connected to the switch module through the first VLAN, which comprises slic and codec chips for transmitting TDM data to the media resource module, or receiving the first data frame forwarded by the media resource module.

11. A method for forwarding data frames by a media gateway device, wherein the media gateway device comprises: a master module, a switch module, at least one relay access module, and at least one media resource module; wherein the switch module comprises a Lan Switch Chip which comprises three independent Virtual Local Area Networks (VLANs): a first VLAN, a second VLAN, and a third VLAN; the relay access module, the master module and the media resource module are connected to the switch module through the first VLAN, the media resource module is further connected to the switch module through the second VLAN, and the switch module is connected to an external Internet Protocol (IP) packet network through the third VLAN, wherein the media gateway device further comprises a network layer static routing table that is configured to store: a Media Access Control (MAC) address corresponding to the second VLAN, an MAC address corresponding to the third VLAN, as well as an MAC address and an IP address corresponding to the media resource module, and wherein the master module comprises a processor and a memory, wherein the processor is coupled to the memory comprising instructions which when executed by the processor cause the processor to perform a control management of the relay access module, the media resource module, and the switch module through the first VLAN, and wherein the media resource module comprises a digital signal processor, the method comprising:

for data frames in the in-node direction:
forwarding by the Lan Switch Chip of the switch module, through the third and second VLANs, a first data frame of the external IP packet network to the media resource module for a processing, according to the MAC address corresponding to the second VLAN, the MAC address corresponding to the third VLAN, as well as the MAC address and the IP address corresponding to the media resource module in the network layer static routing table;

for data frames in the out-of-node direction:
forwarding by the digital signal processor of the media resource module, through the second and third VLANs, a second data frame corresponding to the relay access module to the external IP packet network, according to the MAC address corresponding to the second VLAN, the MAC address corresponding to third VLAN, as well as the MAC address and the IP address corresponding to the media resource module in the network layer static routing table.

12. The method for forwarding data frames according to claim 11, wherein the digital signal processor of the media resource module comprises a packet interface and a digital signal sub-processor, and forwarding by the Lan Switch Chip, through the third and second VLANs, the first data frame of the external IP packet network to the media resource module for a processing, according to the MAC address corresponding to the second VLAN, the MAC address corresponding to the third VLAN, as well as the MAC address and the IP address corresponding to the media resource module in the network layer static routing table comprises:

receiving by the Lan Switch Chip, the first data frame transmitted by an external device in the external IP packet network through the third VLAN, wherein a destination MAC address of the first data frame is the MAC address corresponding to the third VLAN, a source MAC address of the first data frame is an MAC address of the external device, a source IP address of the first data frame is an IP address of the external device, and a destination IP address of the first data frame is an IP address of a packet interface of the media resource module; and by the Lan Switch Chip, translating the destination MAC address of the first data frame into an MAC address of the packet interface, and translating the source MAC address of the first data frame into the MAC address corresponding to the second VLAN, in accordance with the network layer static routing table; and forwarding the re-encapsulated first data frame to the packet interface of the media resource module, so that the packet interface forwards the re-encapsulated first data frame to the digital signal sub-processor for a processing;

wherein forwarding by the digital signal processor of the media resource module, through the second and third VLANs, the second data frame corresponding to the relay access module to the external IP packet network, according to the MAC address corresponding to the second VLAN, the MAC address corresponding to third VLAN, as well as the MAC address and the IP address corresponding to the media resource module in the network layer static routing table comprises:

by the digital signal sub-processor, receiving TDM data of the relay access module, encapsulating the TDM data as the second data frame according to the network layer static routing table, and forwarding the second data frame to the packet interface, wherein a destination MAC address of the second data frame is the MAC address corresponding to the second VLAN, a source MAC address of the second data frame is the MAC address of the packet interface, a source IP address of the second data frame is an IP address of the packet interface, and a destination IP address of the second data frame is an IP address of the external device;

forwarding by the packet interface, the second data frame to the switch module via the second VLAN; and by the Lan Switch Chip, translating the destination MAC address of the second data frame into the MAC address of the external device, translating the source MAC address of the second data frame into the MAC address corresponding to the third VLAN, in accordance with a network layer dynamic routing table; and forwarding the re-encapsulated second data frame to the external device for a processing.

13. The method for forwarding data frames according to claim 12, wherein receiving by the Lan Switch Chip, the first data frame transmitted by the external device in the external IP packet network through the third VLAN comprises:

receiving by the Lan Switch Chip, through the third VLAN, the first data frame, the destination IP address of which has been translated from an external IP address into the IP address of the packet interface by the network address translation module, wherein the IP address is corresponding to the external IP packet network; and wherein, forwarding, by the Lan Switch Chip, the re-encapsulated second data frame to the external device for a processing comprises:

transmitting, by the Lan Switch Chip, the re-encapsulated second data frame to the network address translation module, so that the network address translation module translates the source IP address of the re-encapsulated second data frame from the IP address of the packet interface into the external IP address, and forwards the translated second data frame to the external device for a processing.

* * * * *